United States Patent [19]
Mayer

[11] 3,815,020
[45] June 4, 1974

[54] CAPACITANCE/INDUCTANCE DISTANCE MEASUREMENT DEVICE

[75] Inventor: Ferdy Mayer, Grenoble, France

[73] Assignee: Laboratoire D'Electronique et D'Automatique Dauphinois, L.E.A.D., Grenoble, France; a part interest

[22] Filed: Nov. 24, 1972

[21] Appl. No.: 309,406

[30] Foreign Application Priority Data
Nov. 24, 1971 Germany................ 2158320

[52] U.S. Cl............................................ 324/61 R
[51] Int. Cl............................................ G01r 27/26
[58] Field of Search .......... 324/61 QL, 61 QS, 61 R

[56] References Cited
UNITED STATES PATENTS
3,012,193  12/1961  Breen............................ 324/61 QS
3,096,591  7/1963  Higgins, Jr. et al. .......... 324/61 QL
3,140,608  7/1964  Clark............................. 324/61 QS
3,227,952  1/1966  Proebster et al............. 324/61 R X
3,408,566  10/1968  Norwich........................ 324/61 R
3,688,190  8/1972  Blum............................. 324/61 R

*Primary Examiner*—Stanley T. Krawczewicz
*Attorney, Agent, or Firm*—Sughrue, Rothwell, Mion, Zinn & Macpeak

[57] ABSTRACT

A non-contact relative range measuring device for gauging the distance between a remote sensing device and an object. A remote sensing element and a reference sensing element are alternately connected to a source of signals capable of creating an electromagnetic field and a reference field, respectively. The two fields, when alternately created, also modify the signal from the signal source. The modified signal is applied to a measuring device capable of developing a measure of the difference in the modified signal due to the electromagnetic field and the reference field.

32 Claims, 12 Drawing Figures

CAPACITANCE/INDUCTANCE DISTANCE MEASUREMENT DEVICE

BACKGROUND OF THE INVENTION

1. Field of the Invention

The invention relates to a non-contact relative range measurement device in which an electromagnetic field is established between a workpiece and at least one remote sensing element separated therefrom at a distance to be gauged: said electromagnetic field changing as the unknown distance changes.

2. Prior Art

It is already known in the art to use a rotary probe for non-contact range measurement and more particularly, for centering a workpiece within a hole.

SUMMARY OF THE INVENTION

The object of the invention is to create a measurement device of the above-mentioned type, which is capable of providing particularly precise and reliable measurements while being of extremely simple yet solid construction.

Another object of the invention is to create a measurement device having very small dimensions.

In addition, the measurement device according to the invention is intended to offer the maximum universality of application. More particularly, it is also intended to be suitable for measuring capacitances, inductances and resistances by reducing these measurements to the range measurement according to the invention.

A final object of the invention is to render these measuring operations largely automatic.

According to the invention this problem is solved in that: a source supplying signals serving to establish an electromagnetic field is adapted to be connected via a switching device to the remote sensing element and to at least one reference sensor permanently assigned to the remote sensing element alternately. A reference field similar to the measuring field disposed between the remote sensing element and the workpiece, is adapted to be controlled by the reference sensor. A measuring device is also provided, to which is supplied the signal from the signal source, modified alternately by the measuring field and the reference field, and by means of which the difference between the two periodically alternating signal components of the modified signal, is determined and represented as a criterion for the range to be gauged.

In accordance with an essential idea of the invention, a measuring probe arrangement which electrically simulates the mechanical rotational movement, is provided in place of a mechanical, rotary measuring probe.

According to the invention an essential advantage is thus obtained, in that the difficulties caused by mass inertia, friction and similar mechanical effects are overcome in a progressive manner. In addition, the invention also eliminates measurement innaccuracies caused by bearing play.

Another essential advantage of the device according to the invention is that measuring accuracy cannot be adversely affected by tolerances of constructional elements such as diodes, resistors, condensors and the like, as comparitive measurements are carried out by a reference probe at relatively frequent intervals. Neither do drift phenomena in oscillators, amplifiers and similar devices adversely affect measuring accuracy According to a preferred embodiment of the invention, there is provided a remote sensing element having associated therewith a capacitive reference sensor. An inductance is also provided between the signal source and the switching device.

Advantageously, the remote sensing element and the reference sensor are in the form of flat or curved plates.

This embodiment is particularly suitable for centering a tool within a hole in a workpiece. When measuring the distance between a remote sensing element and the surface of a workpiece it is advantageous for the reference sensor to be a regulatable condensor.

This form of embodiment enables the remote sensing element to be arranged opposite a workpiece on the measuring section. It also enables a reference field, comparable to the measuring field, to be adjusted by a rotary condensor in dependence on the range ratios at that time.

To ensure that various frequencies are available for the signal establishing an electromagnetic field, the signal source according to the invention is advantageously a variable frequency oscillator.

Advantageously, a Clapp-oscillator is used. As maximum measuring accuracy is desired, it is advantageous according to the invention for the frequency of the signal for establishing a field to be substantially higher than the switching frequency.

The oscillator frequency may, for example, be in the order of 1 MHz, and the switching frequency of the switching device ca. 1Hz.

A relatively simple arrangement is obtained by virtue of the fact that the switching device consists of a mechanical switch.

An advantageous development of the invention consists in that the electrical signal serving to establish the field is transmitted via a first switching diode to the remote sensing element and via a second switching diode to the reference sensor and that the switching diodes are switched, in an alternating manner, by corresponding bias voltages, from the conductive state to the blocked state so that the first switching diode is always conductive when the second switching diode is blocked and vice-versa.

As a result, the switching operation from the remote sensing element to the reference sensor is practically inertialess. This embodiment of the invention necessitates the use of switching diodes which have a minimum volume resistivity in the permeable state, and which open as far as possible in the blocked state. These requirements are best satisfied by diodes whose impedance is minimal in the conductive state and whose capacity in the non-conducting sense is also as low as possible. Diodes such as the "Sylvania 5151A" are advantageously used. Their resistance in the permeable state is in the order of 3 ohm and their capacity in the non-conducting sense at ca. 30 volts is 0.1 Picofarad.

According to the invention it is also advantageous for the diodes, which are used, to be capable of converting rapidly from the conducting state to the blocked state and vice-versa. Diodes of the above-mentioned type also fulfil this requirement in an advantageous manner. According to the invention the diodes are isolated in respect of the switching device by inductances, the inductances being selected so that they have an especially high impedance for the relatively high frequencies used to establish a field. However, the impedance used is such that the switching operation at the corresponding low frequency is not adversely affected.

It is also advantageous for the circuit to be as symmetrical as possible.

For this reason, it is advantageous for the two branches of the circuit to be as near identical as possible — with the exception of the remote sensing element or the reference sensor. This considerably facilitates the comparison of these two sensing elements.

The advantage according to the invention, i.e., non-contact switching between the remote sensing element and the reference sensor, is achieved by means of other elecronic switching elements, for example, transistors.

According to another advantageous embodiment of the invention, the two switching diodes are connected in opposition to each other.

In the case of this embodiment, the bias voltage for the switching diodes is preferably supplied by a square-wave generator, to which both switching diodes are connected. The positive square topped pulse alternately shifts one switching diode into the conductive state and the negative square-topped pulse the other switching diode.

To ensure that the oscillator is isolated sufficiently from the square-wave generator, the first switching diode is preferably connected to the square-wave generator via a first choke coil and the second switching diode via a second choke coil. It is also preferable for the inductance of the choke coils to be such that it does not constitute a troublesome resistance for the switching frequency of the switching device, but it does represent a practically insuperable resistance for the frequency of the signal used for establishing a field.

According to an advantageous development of this embodiment, the bias voltages of the diodes are adapted to be regulated in such a manner that the unsymmetry of their blocking capacities may be stabilized by means of an adjustable bias voltage symmetry.

To obtain the most accurate estimate, the signals from the signal source, which have been modified by the remote sensing element and the reference sensor, are advantageously compared in the measuring device. The difference between the corresponding signal periods of the measuring field frequency and the reference field frequency is determined during a switching period.

The arrangement is preferably such that a reversing counter is provided in the measurement device. This counter counts up during the switching-in period of the remote sensing element and down during the switching-in period of the reference sensor. The counter is reversed in switching rhythm by the square-wave generator.

On the one hand this arrangement ensures that the measuring device is of simple, functional construction and on the other hand, it ensures extremely accurate evaluation of the measurement results.

Furthermore, this embodiment may be advantageously provided with digital indication means for the measurement results.

The embodiment provided with digital evaluation means requires the signal source to have a fairly high frequency in order to obtain a given accuracy and corresponding operating time; the operating time being dependent on the switching time required by the square-wave generator, and the measuring accuracy being determined essentially by the number of oscillations counted within a switching period. Consequently, the measuring accuracy increases with higher oscillator frequencies.

According to another preferred embodiment of the invention, it is also possible to use lower oscillator frequencies — without adversely affecting measuring accuracy by so doing. The essence of this embodiment consists in that, instead of counting individual oscillations during a switching period, a period measurement is carried out using a very stable pilot frequency generator which is released for a cycle or half a cycle, and acts on the counter at a satisfactory frequency for the desired accuracy.

The advantage offered by this embodiment of the invention is that fairly low oscillator frequencies can be used without adversely affecting the level of accuracy.

When the switching cycles of the diodes and the measuring cycles pass into each other, i.e., when the frequency measurement is extended over the entire switching cycle, a d.c. voltage components has to be superimposed on the square-wave voltage owing to the fact that the cycle rate has to remain completely constant.

When the measuring process is started independently within the switching cycle, it is sufficient to change the cycle rate of the square wave as this in itself does not contribute any d.c. voltage components. According to another advantageous development of the invention, a first inductance is connected in between the switching device and the remote sensing element and a second inductance is connected in between the switching device and the reference sensor; a given ratio existing between the first and second inductance.

Preferably, this embodiment allows the ratio between the first and second inductance to be converted into decadal stages.

This ratio can preferably also be converted into binary stages.

This embodiment of the invention further comprises an automatic balancing device, by means of which the reference sensor, which corresponds most closely to the remote sensing element, is selected from a plurality of differing reference sensors. The individual sensors are each connected to the switching device via a decoupling diode.

The measuring device according to the invention is thus also suitable for measuring condensors, choke coils or resistances; specific gauging elements or calibration components being compared to the element to be measured.

This type of measuring operation provides a precision measurement similar to a measuring bridge. At the same time, there is the advantage of measurement range selection. This method of procedure is particularly advantageous in that it enables an accurate measurement to be obtained with a simple arrangement.

Different types of oscillators may be used in other advantageous embodiments of the invention. The series resonance circuits may also be replaced by parallel resonance circuits, hybrid T-bridges, T-bridges, RC cascade connections, or combinations thereof.

According to another advantageous embodiment of the invention, the switching diodes are switched by a square - wave voltage with a regulatable pulse mark-tospace ratio; the signal is modified by the remote sensing element and the reference sensor is supplied to a frequency discriminator, with which a modulator is connected in series, said modulator being regulated in such a manner that the signal components are always multiplied by a given positive and negative voltage; and that the modulator output is connected to an integration stage, the output signal of which is supplied to an analog indicator device.

Frequency shift modulation is employed in principle in the case of this embodiment of the invention, i.e., each successive phase has a different frequency which is ascertained by the succeeding discriminator. According to another advantageous development of the invention, the switching diodes are switched by a square-wave voltage with a regulatable pulse mark-to-space ratio the signal modified by the remote sensing element and the reference sensor is supplied to a parallel circuit having a gate, a frequency discriminator and a filter arranged in succession in each of its branches; the gates are regulated by the square-wave voltage in such a manner that the first gate is open and the second gate is shut when the signal source is connected to the remote sensing element and the second gate is open and the first gate shut when the signal source is connected to the reference sensor; and that the outputs of the two gates are supplied to an analog indicator device.

In the case of this embodiment of the invention, the square-wave voltage is preferably supplied by a square-wave generator having two symmetrical outputs.

The zero passages of the square wave generator and the oscillator are preferably synchronized.

Furthermore, the mark-to-space ratio of the square-wave voltage is preferably "one".

The frequency discriminators preferably have inverse characteristics.

Other waveforms may be used to obtain more precisely defined switching conditions during the switching process from the remote sensing element to the reference sensor. More particularly, the diodes may both be blocked or both open for a short period of time.

To center a tool or another object in a hole, the remote sensing element and a reference sensor are arranged at a fixed distance from each other in a hole, with theiir surfaces substantially parallel to the inner wall of the hole. The arrangement consisting of remote sensing element and reference sensor is adapted to be centered with respect to the hole and is also symmetrical The remote sensing element and the reference sensor are thus interchangeable.

In the case of this embodiment, an arrangement is referred to as being absolutely symmetrical when there is a workpiece opposite both the remote sensing element and the reference sensor. This embodiment of the invention is particularly suitable for precision centering inside an opening.

The application range of a centering device may be advantageously increased by arranging several pairs of sensors, consisting of a remote sensing element and a reference sensor, in a plane perpendicular to the axis of the hole and by applying the signal used to establish a field, to the individual pairs of sensors.

However, this arrangement is not limited to a plane and the pairs of sensors may be advantageously arranged along three spatial axes. This type of spatial arrangement may be used advantageously, for example, to control the position of a directional gyro.

If the sensor arrangement according to the invention is used in a spherical space, the measuring probes are preferably so constructed that their surface corresponds to the curvature of the inner wall surrounding them.

To align a plane in a hole the arrangement may advantageously be provided with three pairs of sensors, which are staggered in respect of each other by 120°.

According to another advantageous embodiment of the invention, a compensator device is provided to linearize the information from the device. This compensator device automatically compensates the difference between the version of the signal from the signal source modified by the remote sensing element and the version of the signal modified by the reference sensor. The measure required to obtain compensation is used as a criterion for the distance to be gauged.

Nonlinearities in the oscillator output signal are obviated by means of this embodiment which is also suitable for carrying out the measuring operation in the manner of a self compensating compensator.

The invention will now be described with reference to the accompanying drawings in which.

BRIEF DESCRIPTION OF THE DRAWINGS

DESCRIPTION OF THE PREFERRED EMBODIMENTS

Figure 1:
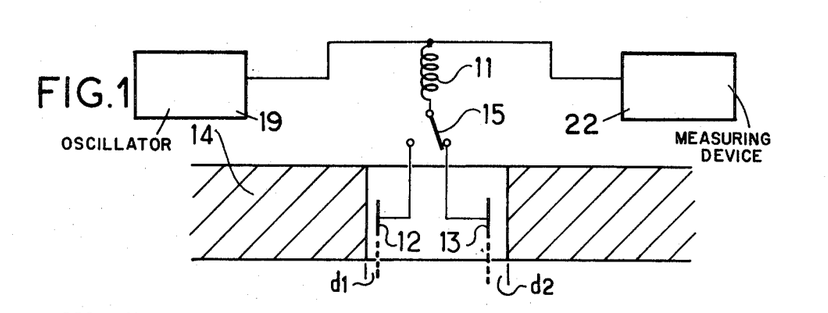
FIG. 1 is an embodiment of the device according to the invention in which two capacitive probes are arranged in a hole and a mechanical switch is provided.

FIG. 1 shows a remote sensing element 12 and a reference sensor 13, arranged in a hole of a workpiece 14, which is represented by the shade lines. The remote sensing element 12 is disposed at a distance d1 with respect to the inner wall of the hole, and the reference sensor 13 is disposed at a distance d2 with respect to the inner wall of the hole. The reference sensor 13 is arranged diametrically opposite to the remote sensing element 12. The output signal from an oscillator 19 is applied alternately to the remote sensing element 12 and the reference sensor 13 via an inductance 11 and a mechanical switch 15. When the signal frequency of the oscillator 19 is supplied alternately to the remote sensing element 12 and the reference sensor 13 by the mechanical switch 15, a frequency of oscillator f1 is obtained during contact with the remote sensing element 12, and a frequency f2 during the connection with the reference sensor 13. The values of $f1$ and $f2$ depend upon the inductance and capacitance of the oscillator load circuit. The capacitance in turn is dependent upon the distance being measured.

The two frequencies $f1$ and $f2$ are supplied to the measuring device 22, which is connected to the oscillator 19. When the remote sensing element 12 and the reference sensor 13 are arranged at a fixed distance from each other, this arrangement may be centered in the hole by pushing the arrangement into the hole until the frequencies f1 and f2 are equal. This can only occur if the two distances d1 and d2 are also equal. The desired centering is thus obtained. The measuring device in general is a system capable of providing a measure of the frequency applied thereto. More specific examples of such systems for providing a measure of the difference between the two frequencies will be described below in connection with FIGS. 9, 10, 11 and 12.

Figure 2:
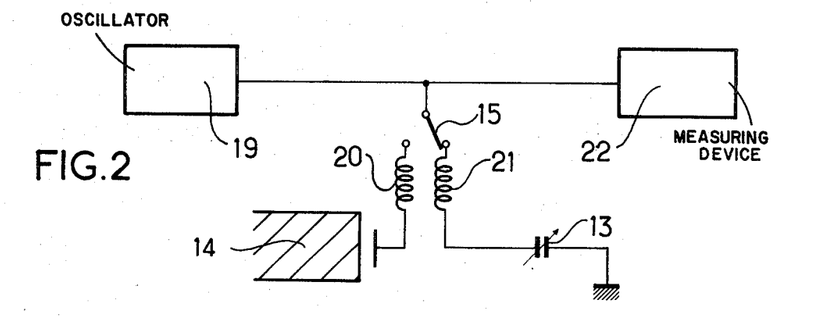
FIG. 2 is a modified embodiment of the device according to the invention in which a capacitance remote sensing element is provided at a distance from a workpiece and a controllable condensor is provided as reference sensor.

FIG. 2 represents a modified arrangement, in which the remote sensing element 12 is disposed opposite a workpiece 14 (represented by the shade lines), and the reference sensor 13 consists of a controllable condenser. An inductance 20 is provided between the mechanical switch 15 and the remote sensing element 12. An inductance 21 is also provided between the switch 15 and the reference sensor 13. As it is a combination consisting of sensing element 12 and inductance 20 or of reference sensor 13 and inductance 21, which is switched each time, low multiplication or division factors may be introduced between the measuring field and the reference field. If, for example, the remote sensing element has a capacitance C2 and represents a high precision calibration condenser of, for example, 50 – 500 pF, capacitances of 5 – 50 pF or 500 – 5000 pF may be measured with the same precision, using a ratio of 10/1 or 1:10 for the ratio of the inductances L1/L2 (L1 corresponds to the inductance 20 and L2 the inductance 21).

Figure 3:
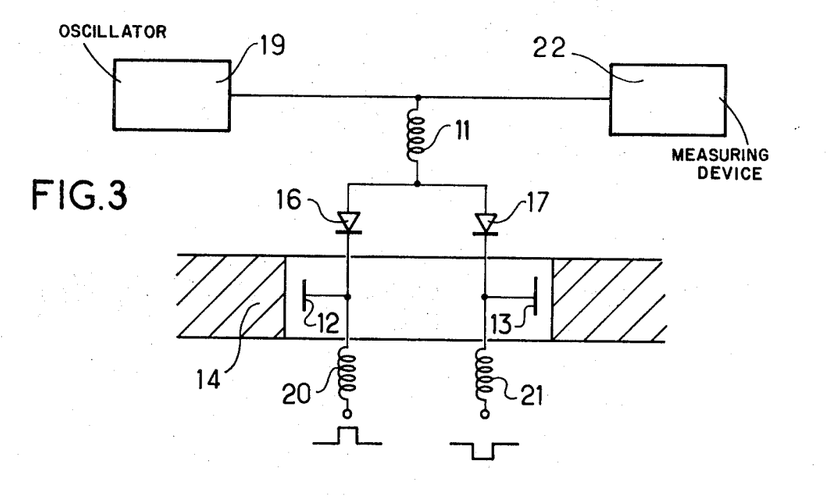
FIG. 3 is a measurement device according to FIG. 1 having an electronic switching device.

According to FIG. 3, an electronic switching device is provided instead of the mechanical switch 15 (see FIGS. 1 and 2). A switching diode 16 is provided between the inductance 11 (see FIG. 1) and the remote sensing element 12, and a switching diode 17 is provided between the inductance 11 and the reference sensor 13. The two switching diodes 16 and 17 are poled in the same direction. A square-wave voltage is supplied to the diodes 16 and 17 via choke coils 20 and 21, the positive square-wave pulses being supplied simultaneously to one diode and the negative pulses to the other diode. The situation is reversed during the subsequent switching cycle. In this way, the same effect is achieved with the electronic switching device as with the mechanical switching device according to FIGS. 1 and 2. However, with the electronic switching device the switching operation is preferably carried out without considering mass and inertia.

Figure 4:
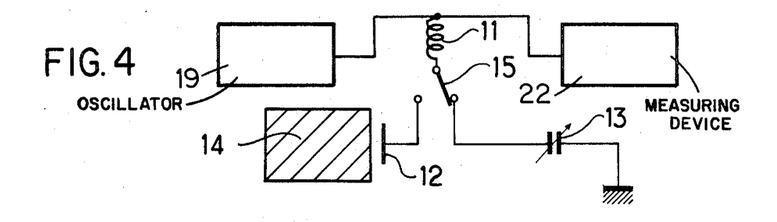
FIG. 4 represents a measurement device according to FIG. 2, having a different inductance arrangement.

FIG. 4 represents, in principle, the same measuring arrangement as FIG. 2. The only difference is that, instead of the two inductances 20 and 21 provided in FIG. 2 between the mechanical switch 15 and the remote sensing element 12, and between the mechanical switch 15 and the reference sensor 13, only one inductance 11 is provided between the oscillator 19 and the mechanical switch 15. This embodiment of the device is particularly suitable for relatively simple measuring assemblies where the distance d1 between a remote sensing element 12 and workpiece (represented by the shade lines), is to be determined.

Figure 5:
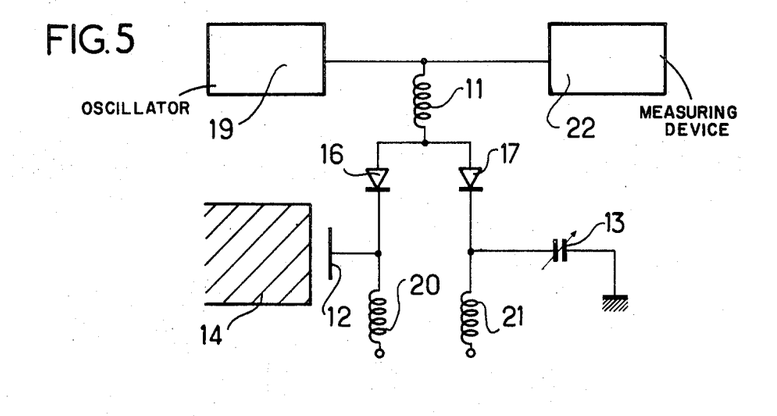
FIG. 5 is a measuring device according to FIG. 4, having an electronic switching system.

The measuring arrangement according to FIG. 5 is essentially the same as the arrangement according to FIG. 3. In this embodiment, however, the reference sensor 13 takes the form of a controllable condenser, as in this case the remote sensing element 12 is used to determine the distance d1 from a workpiece (represented by the shade lines) whereas in the embodiment according to FIG 3, the arrangement consisting of the remote sensing element 12 and the reference sensor 13, disposed at a fixed distance therefrom, is only used for centering the tool in the hole. The embodiment according to FIG. 5 corresponds essentially to the embodiment according to FIG. 2, apart from the fact that the mechanical switch 15 is replaced by electronic switching devices.

Figure 6:
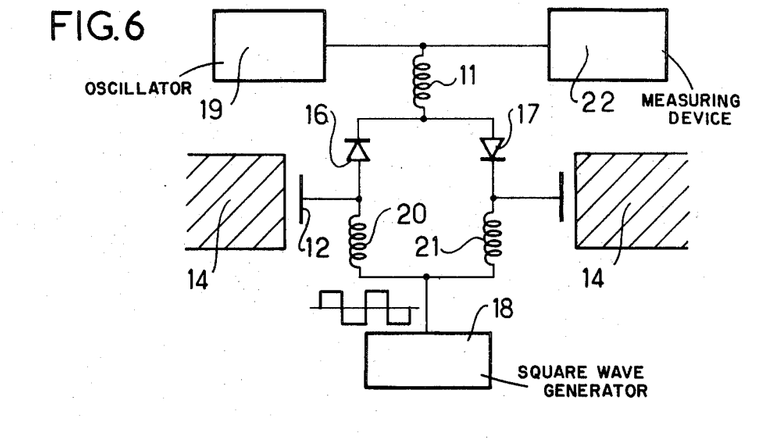
FIG. 6 is another embodiment of the device according to the invention provided with diodes having oppositely directed poles.

FIG. 6 shows another embodiment of the device according to the invention. This embodiment differs from the embodiment according to FIG 3 in that the two switching diodes 16 and 17 are poled in opposite directions, and are supplied by a common square-wave generator 18 via two choke coils 20 and 21. The method of operation of this arrangement is such that a positive square wave simultaneously blocks one diode and places the other in the conducting state. This situation is then reversed during the next negative square-wave pulse.

Figure 7:
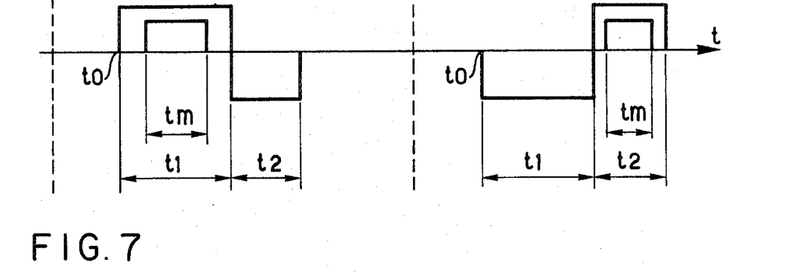
FIG. 7 is a schematic representation illustrating the method of operation of the device according to the invention.

FIG. 7 is a diagram showing how the operation of measuring the signal supplied by the oscillator is started independent of the switching cycle. If this operation is started independently in the middle of a switching cycle, it suffices to change the pulse mark-to-space ratio of the square wave, as this does not supply any d.c. components. The diode 16 is connected in from the moment to onwards, for the period of time $t1$, but the frequency measuring operation only takes place for the period $t_m$ within the period of time $t1$. This procedure is repeated in a similar manner in the next switching cycle.

Figure 8:
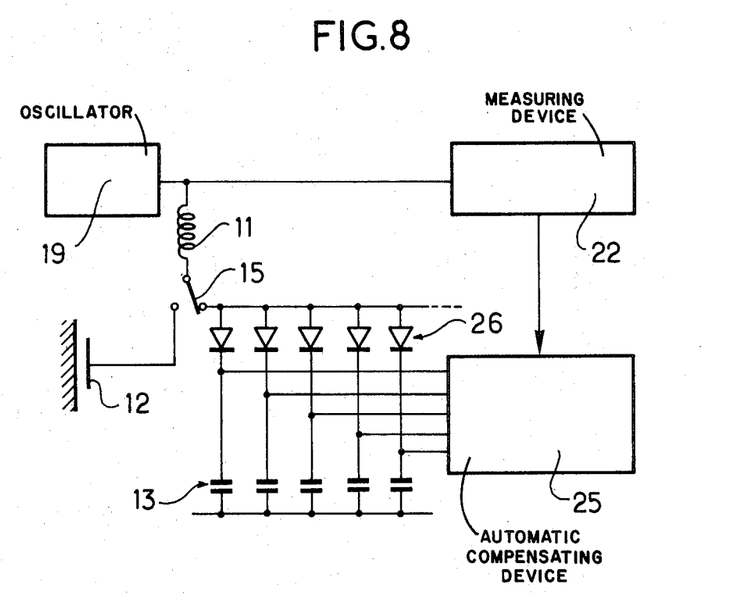
FIG. 8 is a preferred embodiment of the device according to the invention for measuring capacitances, inductances and ohmic resistances.

In FIG. 8, the reference sensor consists of a series of condensers 13, which are connected in parallel and each connected to a mechanical switching device 15 via a decoupling diode 26. A tap, which is connected to an automatic commuating device 25, is provided between each of the decoupling diodes 26 and the condensers 13. This method of operation of this automatic commuating device is such that an automatic logic determines the reference sensor 13 whose value comes closest to that of the remote sensing element 12. Thus the arrangement operates in the manner of a self-compensating measuring bridge, and is used to measure inductances, capacitances or resistances. The arrangement is provided with automatic measuring range switching means. The values of the condensers 13 are either in decadal or binary stages depending on the application of the arrangement. The combination of measuring device 22 and commutating device 25 is simply a digital voltmeter incorporated in a controlled loop. Such devices are well known in the art and examples may be found in Electronics, May 25, 1970, page 25; Electronics, July 6, 1970, page 71; and Digitest 500: Electronique Industrielle May 1969, page 319 et seq. A frequency variation in the frequency applied to device 22 when 15 switches from device 12 to a reference capacitor 13 produces an analog signal which controls commutation of the capacitors 13.

Figure 9:
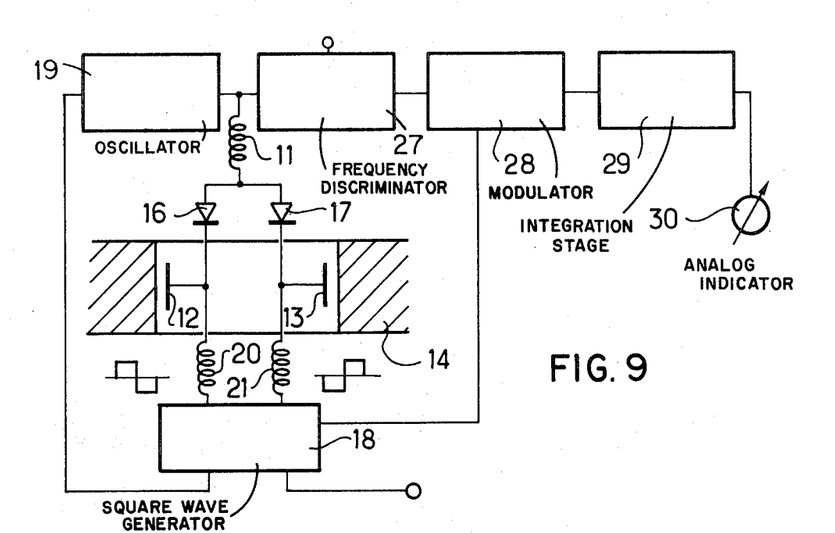
FIG. 9 is an embodiment of the measurement evaluation means.

A more detailed example of the measuring part 22 of the embodiment according of FIG. 3 is illustrated in FIG. 9, wherein the measuring device consists of a frequency discriminator 27, a modulator 28, an integration stage 29 and an analog indicator 30, disposed in succession. The square wave generator 18 supplies a square-wave voltage with the pulse mark-to-space ratio "1". The signal supplied by the oscillator 19 is essentially frequency shift modulated, i.e., the frequency changes in the switching rhythm from a first frequency $f1$ to a second frequency $f2$. These frequencies are supplied to a frequency discriminator 27. With suitable zeropoint control, the frequency $f1$ supplies a positive voltage and the frequency $f2$, a negative voltage. When the signals in the modulator 28, which is controlled by the square-wave generator 18, are multiplied by a + or −1 factor, an output signal is sent by the integration stage 29 (filter) associated with the modulator 28, directly to an analog indicator device 30.

The oscillator (Clapp type) may, if necessary, be synchronized with the square-wave generator 18, to overcome transitional and/or reflection problems. The frequency discriminator 27 may be any conventional frequency discriminator of the type which converts frequency into voltage. Examples are found in "Frequency Modulation Receivers" by Cook and Liff, Prentice Hall. The modulator 28, which is controlled by the output of square wave generator 18, effectively modulates the signal from discriminator 27 with the square wave. The actual device used may be a conventional phase detector or synchronous detector examples of which are found in the following references:

Phase Selector Detectors
  Electronics Buyer's Guide, June 1964, pages 16–18,
Servo Modulators
  Control Engineering, Reprint 1957,
Rectifier Modulators With Frequency-Selective Terminations
  The Institution of Electrical Engineers, January 1960, pages 262–272,
Diode Phase-Sensitive Detectors With Load Electronic Engineering, October 1959, pages 613–616, U.S. Pat. No. 3,411,074, and
U.S. Pat. No. 3,413,542.

The integrator filter 29 is a conventional device. An example may be found in, "Operational Amplifiers, Design Applications," by Tobey et al, McGraw Hill Book Company.

Figure 10:
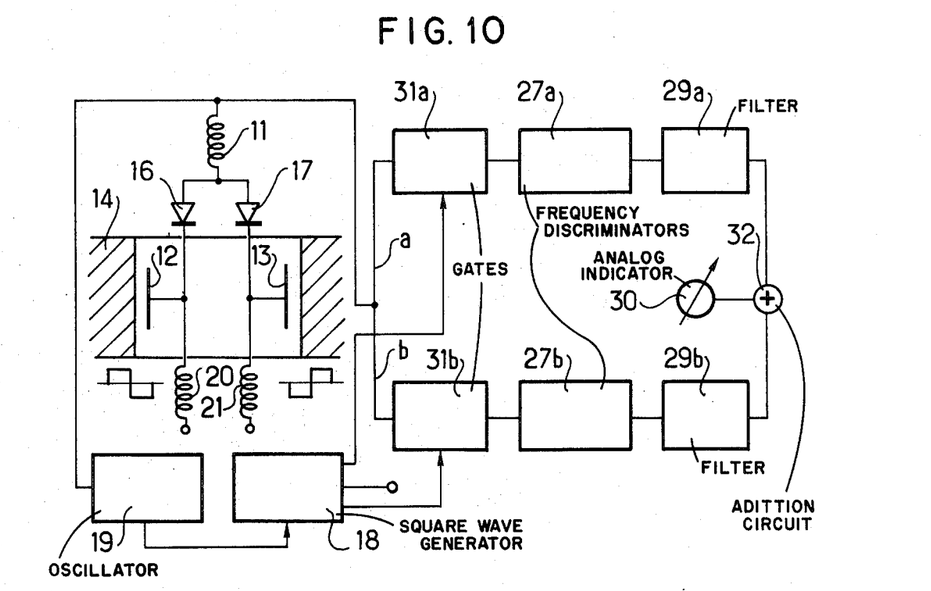
FIG. 10 is another embodiment of the measurement evaluation means having analog indication means.

The arrangement represented in FIG 10 corresponds in principle to the embodiment shown in FIG. 9, with the exception that the output signal from the oscillator 19 is supplied to a measuring circuit 22 consisting of two parallel branches, a and b. In each of its branches, $a$ and $b$, the evaluation circuit comprises a gate 31a, a discriminator 27a and a filter 29a. These are connected in series. The gates 31a and 31b are controlled by the square-wave generator 18 in such a manner that one gate, for example 31a, is always closed during a positive square-wave pulse, while the other gate (31b) is simultaneously blocked. During the subsequent negative pulse the situation is reversed. In this way, the signals with the frequency $f1$ are always supplied to one branch of the evaluation circuit and the signals with the frequency $f2$ to the other branch. The filters 29a and 29b are both connected via an addition circuit 32 to an analog indicator device 30. The zero position of the square-wave voltage supplied by the square-wave generator 18 may be adjusted by means of a separate control evice.

Frequency discriminators 27a and 27b, which possess inverted characteristics, are preferably used. Frequency discriminators 27a and 27b may be the same as frequency discriminator 27 of FIG. 9. Integrators 29a and 29b may be the same as integrator 29 of FIG. 9. The gates 31a and 31b are simply analog gates of the type well known in the art. In response to a gating pulse, in this instance a positive pulse, the signal appearing at the input of the gate is applied to the output.

Figure 11:
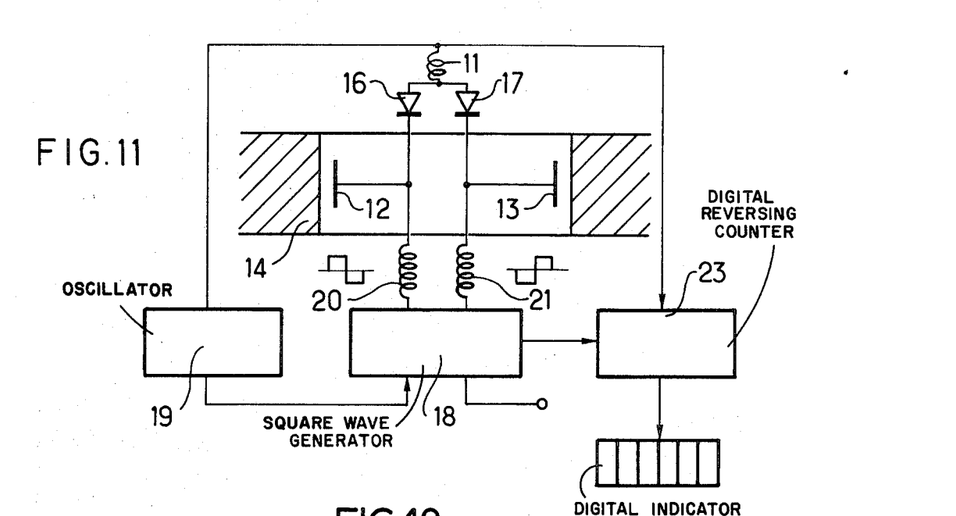
FIG. 11 is another embodiment of the measurement evaluation means having digital indication means.

The evaluation device shown in FIG. 11 differs from the previous embodiments in that the output signal from the oscillator 19 is supplied to a digital reversing counter 23, otherwise known as an up/down counter, after being modified by the measuring or reference probes. The method of operation of this arrangement consists essentially in that the reversing counter 23 counts up or adds during the period of connection to the remote sensing element 12 and counts down in the other direction during the period of connection to the reference sensor 13. In the process the counter 23 operates in the manner of a frequency counter. If, for example, the respective distances to the inner wall from the remote sensing element 12 and the referrence sensor 13 are identical, the reversing counter first counts up to a specific number during the period of connection of the remote sensing element 12, and then then counts down by exactly the same amount during the period of connection of the reference sensor 13. The final result "O" indicates that the remote sensing element 12 influences the the frequency of the oscillator 19 in exactly the same way as the reference sensor 13, i.e., the corresponding distances between the sensors and the workpiece 14 are identical. A five place digital indicator is attached to the counter 23.

Tests have shown that a measuring accuracy of ca. $10^{-3}$ can be obtained at a range of 1mm and a measuring accuracy of ca. $10^{-2}$ at a range of 5mm, using "Sylvania 5151 A" switching diodes with a $2cm^2$ probing area and an oscillator frequency of 10 MHz.

Figure 12:
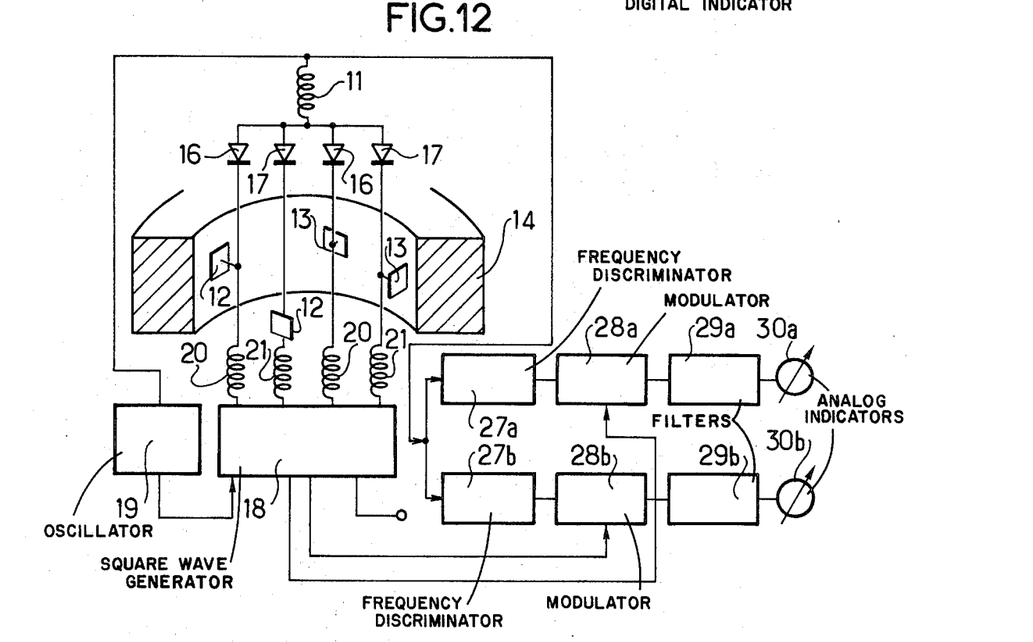
FIG. 12 represents a measurement device having several pairs of sensors for centering purposes.

According to the embodiment shown in FIG. 12, two pairs of remote sensing elements and reference sensors are arranged in a plane, which is substantially perpendicular to the axis of a hole in a workpiece 14. The signal from the oscillator 19 is applied in a cyclic manner to the individual pairs of sensors 12, 13, via an inductance 11 and corresponding switching diodes. Choke coils 20 and 21 are provided between each of the diodes 16, 17, and the square-wave generator 18. The evaluating part corresponds essentially to that described in connection with FIG. 9 and, more particularly, FIG. 10. The arrangement according to FIG 12 enables a plane to be centered in respect of a hole. The embodiment shown in FIG. 12 may be used in a similar way in space arrangements, where it is advantageous to use a gyroscope for monitoring the position.

In the embodiment according to FIG. 12, the surfaces of the remote sensing elements 12 and the reference sensors 13 preferably conform to the curvature of the inner wall of the hole in the workpiece 14. When using similar arrangements in a spheroidal cavity, the probes are preferably curved to conform to the inner wall of the sphere.

The measuring arrangement according to FIG. 12 is also especially suitable for determining the angle of inclination between two planes, and, more particularly, in examining the parallelism of two planes.

When the above-described procedure is followed using a compensating device to compensate nonlinearities in the response characteristic of the measuring device, it must be appreciated that these nonlinearities originate essentially from the characteristic curve of the oscillator. The appropriately modified frequencies $f1$ and $f2$ are obtained as a function of the distances $d1$ and $d2$ in the measuring and reference fields, by way of the following equations:

$$f_1 = (1/2\pi)(1/\sqrt{LC_1}) = (1/2\pi)[1/\sqrt{(L \epsilon S)/d_1}] \quad (1)$$

$$f_2 = (1/2\pi)(1/\sqrt{LC_2}) = (1/2\pi)[1/\sqrt{(L(\epsilon S)/d_2}] \quad (2)$$

S represents the surface of the probes or the sensors. L represents the effective inductance, and $d1$ and $d2$ the distances between the sensors and the workpiece.

The capacitances C1 and C2 are generally parallel to a fixed connection capacitance Co, so that the frequencies $f1$ and are then obtained by way of the following equations:

$$f1 = (1/2\pi)[1/\sqrt{L(C_0+C_1)}] = (1/2\pi)[1/\sqrt{L(Co+S)/d1}] \quad (3)$$

$$f2 = (1/2\pi)[1/\sqrt{LC_0+C_2}] = (1/2\pi)[1/\sqrt{L(Co+\epsilon s)/d_2}] \quad (4)$$

It is obvious from the above equations that the corresponding curves are not linear. On the other hand, on varying the parameter d slightly by a given fixed value, the variations in the frequencies are proportional. This may be observed from the differentiation of the above equations:

$$f = a\ d \text{ (a is a constant)}$$

As may be seen from the above statements, there is practically a linear relationship between the difference $f$ between the frequencies $f1$ and $f2$ and the difference $d$ between the parameters $d1$ and $d2$, when the frequencies $f1$ and $f2$ are almost identical.

Linearization of the response state of the measuring device according to the invention may thus be obtained by means of a compensating device as described above.

To illustrate the degree of accuracy, which may be obtained by means of the device according to the invention, some numerical values, which were obtained from corresponding tests and experiments, will now be indicated.

In these tests, the probe surface was 2 cm$^2$, the oscillator frequency 10 MHz, and the switching frequency 1 Hz. "Sylvania 5151 A" diodes were used.

The following experimental data is also based on:

A direct relative resistance variation of 0.465 (the absolute value is not critical); dissymmetry in the impedance of the switching device of $8.3 \times 10^{-2}$; a static variation (at 25°C) in the blocking capacitances of the diodes of $8.9 \times 10^{-3}$ (most critical value); a variation in the temperature coefficients of $9 \times 10^{-3}$, which acts on the blocking capacitance of the diode connection.

(This corresponds to a total variation in the temperature of from + or − 27°C to 25°C or an amplitude difference in the switching signal of from + or − 0.27 volts to −30 volts in the blocking direction).

When measuring a range of 0.1 mm, the obtainable relative accuracy is $10^{-4}$, i.e., the absolute accuracy corresponds to 1/100 microns.

With the device according to the invention and using diodes of the above-mentioned type, it is possible to measure with a relative accuracy of $10^{-3}$ at a range of 1 mm and with a relative accuracy of $10^{-2}$ at a distance of 5mm. From these figures it will be noted that the relative accuracy obtainable with the device according to the invention, increases considerably as the measuring range decreases.

What is claimed is:

1. A non-contact relative range measurement device in which an electromagnetic field is established between a workpiece and at least one remote sensing element separated therefrom at a distance to be gauged, said electromagnetic field changing as the unknown distance changes, comprising,
   a. a signal source means for supplying a signal to establish said electromagnetic field,
   b. at least one reference sensor associated with said remote sensing element and adapted to provide an adjustable reference field,
   c. switching device means for alternately connecting said signal source to said remote and reference sensing elements to cause said signal to be modified alternately by said electromagnetic and reference fields,
   d. measuring device means, connected to receive said signal after being modified, for measuring the difference between the two periodically alternating components of said modified signal caused by said electromagnetic and reference fields, respectively.

2. A device according to claim 1 wherein said signal source means is a variable frequency oscillator.

3. A device according to claim 1 wherein the frequency of the signal for establishing the field is substantially greater than the switching frequency of said switching device.

4. A device according to claim 1 wherein said switching device is a mechanical switch.

5. A device according to claim 1 wherein the signal for establishing a field has a frequency of 10 MHz and that the switching device is activated at a switching frequency in the order of 1 Hz.

6. A device according to claim 1 characterized in that, when a relatively low frequency of the oscillator (19), is used, a frequency stable pilot frequency generator (24), is provided, said pilot frequency generator being freed during a period of half period of the oscillator (19) and acting on the counter (23).

7. A device according to claim 1 further comprising a compensating device for automatically compensating the difference between the version of the signal from the signal source modified by said remote sensing element and the version of the signal from the signal source modified by said reference sensor; the measure required to achieve compensation being used as a criterion for the distance to be gauged.

8. A device according to claim 33 wherein said remote sensing element is a capacitive remote sensing element, said reference sensor is a capacitive reference sensor and an inductance is connected between said signal source means and said switching device means.

9. A device according to claim 8, wherein said remote sensing element and said reference sensor are in the form of flat plates.

10. A device according to claim 8, wherein said reference sensor is a variable condenser.

11. A device according to claim 8 further comprising a first inductance connected in between said switching device means and said remote sensing element and a second inductance connected in between said switching device means and said reference sensor a predetermined ratio existing between said first and second inductances.

12. A device according to claim 11, characterized in that, said ratio is a multiple of ten.

13. A device according to claim 11, characterized in that, said ratio between the first and second inductance may be converted into binary stages.

14. A device as claimed in claim 11, further comprising:
a. a plurality of additional different reference sensors,
b. a like plurality of decoupling diodes for connecting said reference sensors, respectively, to said switching device means, and
c. automatic compensating device means connected to said measuring device means and to said decoupling diodes for selecting the one of said reference sensors from said plurality of reference sensors which corresponds most closely to said remote sensor.

15. A device according to claim 1 wherein said measuring device means comprises a means for detecting the difference, during a switching period, between the number of periods of said signal modified by said electromagnetic field and the number of periods of said signal modified by said reference field.

16. A device according to claim 15, wherein said detecting means comprises a reversing counter adapted to count up during the switching in period of the remote sensing element and to count down during the switching in period of the reference sensor and means for reversing the direction in which said counter counts in switching rythm with said biasing means.

17. A device according to claim 1 wherein said remote sensing element and said reference sensor are arranged in a hole at a fixed distance from each other with their surfaces substantially parallel to the inner wall of the hole, the assembly consisting of the remote sensing element and the reference sensor being symmetrical and adapted to be centered in respect of the hole, such that the remote sensing element and the reference sensor are interchangeable.

18. A device according to claim 17, wherein a plurality of sensor pairs consisting of a remote sensing element and a reference sensor are arranged in plane perpendicular to the axis of the hole, and that the signal for establishing a field is applied in a cyclical manner to the individual pairs of sensors.

19. A device according to claim 18, wherein three pairs of sensors which are staggered in respect of each other by 120°, are provided.

20. A device according to claim 1 wherein said switching device means comprises,
a. a first diode for connecting said signal from said signal source to said remote sensor when said first diode is biased in a conducting direction,
b. a second diode for connecting said signal from said signal source to said reference sensor when said second diode is biased in a conducting direction, and
c. means for alternately biasing said first and scond diodes in said conducting direction whereby the first diode is conducting when the second is blocked and vice-versa.

21. A device according to claim 20 wherein said first and second diodes are connected in opposition to one another.

22. A device according to claim 21, wherein said means for biasing comprises a square-wave generator connected to said two switching diodes, the positive square-wave pulses putting one of the switching diodes into the conductive state and the negative square-wave pulses putting the other switching diode into said conducting state.

23. A device according to claim 20 wherein first switching diode is connected to said biasing means via a first choke coil and said second switching diode is connected to said biasing means via a second choke coil, and wherein the inductance of said choke coils is selected to provide a low impedance at the switching frequency of the switching device and a very high, substantially blocking, impedance to the electrical signal for establishing the field.

24. A device according to claim 23 wherein each said switching diode has an impedance in the forward direction of approximately 3 ohm at maximum and has a capacitance in the blocking direction (ca. 30 volts) of approximately 0.1 picofarad.

25. A device according to claim 24 wherein the transition of the diodes from the conductive state to the blocked state takes place in a relatively short time.

26. A device according to claim 25 wherein the bias voltages of the diodes may be regulated in such a manner that the dissymmetry of their blocking capacitances may be controlled by an adjustable bias voltage dissymmetry.

27. A device according to claim 20, wherein said switching diodes are each switched in response to a square-wave voltage having an adjustable pulse mark-to-space ratio from a square-wave generator; and wherein said measuring device comprises a parallel circuit having connected in series in each of its branches, a gate, a frequency discriminator and a filter, said gates being controlled by said square-wave generator in such a manner that the said first gate is open and the said second gate closed when the signal source is connected to the remote sensing element, and the second gate is open and the first gate closed when the signal source is connected to the reference sensor; and an analog indicator device connected to receive the outputs of both said gates.

28. A device according to claim 27 wherein said frequency discriminators have inverse characteristics.

29. A device according to claim 20, wherein said switching diodes are each switched by a square-wave voltage having a regulatable pulse mark-to-space ratio, and wherein said measuring device comprises a frequency discriminator connected to receive said modified signal, a modulator connected in series with said discriminator, said modulator being controlled in such a manner that the signal components are each multiplied by a positive and negative voltage, an integrator connected to the output of said modulator and an analog indicator connected to the output of said integrator.

30. A device according to claim 29, wherein the pulse mark-to-space ratio of the square-wave voltage is "one".

31. A device according to claim 29 wherein said square-wave voltage is supplied by a square-wave generator with two symmetrical outputs.

32. A device according to claim 31, characterized in that the zero passages of the square-wave generator and of the oscillator are synchronized.

\* \* \* \* \*